United States Patent
Flechsig et al.

(10) Patent No.: US 8,338,742 B2
(45) Date of Patent: Dec. 25, 2012

(54) DYNAMIC TEST GLIDE HEAD CALIBRATION USING LASER ADJUSTMENT

(75) Inventors: Karl Arthur Flechsig, Los Gatos, CA (US); Iraj Kavosh, San Jose, CA (US); Gurinder Pal Singh, San Jose, CA (US); Tim Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1394 days.

(21) Appl. No.: 12/005,571

(22) Filed: Dec. 26, 2007

(65) Prior Publication Data

US 2009/0168212 A1 Jul. 2, 2009

(51) Int. Cl.
 *B23K 26/00* (2006.01)
(52) U.S. Cl. ......... 219/121.6; 219/121.85; 219/121.65; 219/121.66; 360/25; 360/75
(58) Field of Classification Search ............ 219/121.6, 219/121.62, 121.65, 121.66, 121.78, 121.83, 219/121.85; 360/25, 75, 76, 235.1; 356/507; 73/1.89
See application file for complete search history.

(56) References Cited

U.S. PATENT DOCUMENTS

| | | | | |
|---|---|---|---|---|
| 4,796,122 A * | 1/1989 | Levy et al. | ............ | 360/98.01 |
| 5,280,340 A * | 1/1994 | Lacey | ............ | 356/507 |
| 5,347,415 A * | 9/1994 | Murata et al. | ............ | 360/137 |
| 5,379,171 A * | 1/1995 | Morehouse et al. | ............ | 360/255 |
| 5,689,064 A * | 11/1997 | Kennedy et al. | ............ | 73/105 |
| 5,712,463 A * | 1/1998 | Singh et al. | ............ | 219/121.6 |
| 5,815,346 A * | 9/1998 | Kimmal et al. | ............ | 360/236.6 |
| 5,901,001 A * | 5/1999 | Meyer et al. | ............ | 360/25 |
| 5,995,335 A * | 11/1999 | Jurgenson et al. | ............ | 360/244.8 |
| 6,011,239 A * | 1/2000 | Singh et al. | ............ | 219/121.6 |
| 6,057,975 A * | 5/2000 | Yaeger et al. | ............ | 360/75 |
| 6,072,151 A * | 6/2000 | Jurgenson et al. | ............ | 219/121.85 |
| 6,073,486 A | 6/2000 | Packard et al. | | |
| 6,142,006 A * | 11/2000 | Marchon et al. | ............ | 73/1.81 |
| 6,164,118 A * | 12/2000 | Suzuki et al. | ............ | 73/1.89 |
| 6,178,157 B1 | 1/2001 | Berg et al. | | |
| 6,293,135 B1 | 9/2001 | Marchon et al. | | |
| 6,363,777 B1 | 4/2002 | Tsay et al. | | |
| 6,388,842 B1 * | 5/2002 | Murphy | ............ | 360/244.8 |
| 6,408,677 B1 | 6/2002 | Suzuki | | |
| 6,577,466 B2 | 6/2003 | Meyer et al. | | |
| 6,662,623 B2 | 12/2003 | Baumgartner et al. | | |
| 6,711,929 B2 * | 3/2004 | Yamaguchi et al. | ............ | 72/342.1 |
| 6,771,453 B2 * | 8/2004 | Baumgartner et al. | ............ | 360/75 |
| 6,797,130 B2 * | 9/2004 | Kavosh et al. | ............ | 428/835.1 |
| 6,947,242 B2 | 9/2005 | Seing et al. | | |
| 7,031,103 B2 * | 4/2006 | Yoo | ............ | 360/97.11 |
| 7,121,133 B2 | 10/2006 | Chu et al. | | |
| 7,212,000 B2 * | 5/2007 | Wang et al | ............ | 324/212 |
| 7,692,888 B2 * | 4/2010 | Duan et al. | ............ | 360/75 |
| 2003/0051529 A1 * | 3/2003 | Baumgartner et al. | ............ | 73/1.89 |

(Continued)

*Primary Examiner* — Henry Yuen
*Assistant Examiner* — John Wasaff
(74) *Attorney, Agent, or Firm* — D'Arcy H. Lorimer; Lorimer Labs (57) ABSTRACT

Methods and apparatus for the calibration and use of test glide head gimbal assemblies are disclosed. Calibration is performed by pulse laser adjustment of the flexure mounted to the glide head, while the head is flying above a media test disk having asperities of known dimensions. The calibration process normalizes the fly heights of glide heads used to measure defects on both upper and lower surfaces of disk drive media, allowing upper and lower surfaces to be scanned simultaneously.

20 Claims, 8 Drawing Sheets

U.S. PATENT DOCUMENTS

2003/0086197 A1* 5/2003 Baumgartner et al. ......... 360/75
2005/0117241 A1* 6/2005 Wang et al. .................... 360/53
2007/0080148 A1 4/2007 Hirano et al.
2010/0321830 A1* 12/2010 Dong et al. ................ 360/235.1

* cited by examiner

DYNAMIC TEST GLIDE HEAD CALIBRATION USING LASER ADJUSTMENT

BACKGROUND OF THE INVENTION

1. Field of the Invention

This invention relates to apparatus and methods for testing magnetic media. More specifically, the invention relates to apparatus and methods for calibrating test glide head assemblies.

2. Description of the Related Art

The ongoing march toward greater storage densities in the electronics industry has driven the disk drive manufacturers to produce magnetic media having significantly higher areal densities. One of the consequences of increased areal densities is that a single bit of magnetic information occupies a much smaller area on the surface of the disk drive media, requiring that the read/write heads "fly" at a height much closer to the surface. The fly height is on the order of tens of nanometers for today's advanced disk drive designs, and will probably be reduced further in the future. As fly heights decrease, imperfections in the magnetic media surface, particularly those that extend above the plane of the surface, become increasingly important. A collision of the read/write head with an asperity or defect extending above the surface can lead to a catastrophic head crash.

In order to insure proper operation of the disk drive, manufacturers generally test the integrity of the magnetic media by scanning the surface with a test glide head designed to detect contact with defects extending above the magnetic media surface. A specially designed transducer detects contact and produces an electrical signal in response. During media testing, the test glide head flies above the surface at a height lower than the expected fly height of the production disk drive read/write head. This assures no surface media defects will contact the read/write head in actual operation. However, this assurance can only be obtained if the test glide head fly height can be accurately calibrated. This is generally done by using a media disk having asperities of a known dimension deliberately introduced on the surface. The test glide head is then "flown" over the asperities until contact is detected, which then confirms the fly height. It is often desired that the media rotation rate (or linear velocity) be maintained within a target range to assure conformity with the actual operation within the drive. To do this, some other parameter, such as "gram loading" is adjusted to produce contact with the asperities at the desired media RPM. Due to individual structural and aerodynamic differences of each test glide head assembly, the gram loading requirements are different for every assembly, and must be adjusted separately for each. Since each media disk has an upper and a lower surface, two test glide heads are utilized to test both surfaces. These two test heads are often mounted together, opposing each other with the media inserted in between. Due to aerodynamic differences between upper and lower surfaces, the testing must often be done at two different rotation rates, requiring about double the test time to test both upper and lower surfaces.

Typically, the gram loading adjustment is made by measuring the angle of an unloaded suspension and glide head relative to the position the head would have loaded and resting on the disk. See, for example, US Patent Application Publication 2007/0080148. Deflection of the suspension through this angle produces the gram load force on the glide head, which is counterbalanced by hydrodynamic forces when the head is flying above the media surface. In past practice, the unloaded suspension angle is adjusted by thermal treatment of specific suspension components. Similarly, adjustment of glide head pitch angle (pitch static attitude, PSA) and roll angle (roll static attitude, RSA) are made with glide heads in a static condition, that is, not flying over an actual rotating disk surface. The required unloaded suspension angle is correlated by measurement and experience to produce a fly height within a given range, but fine tuning of the RPM is usually necessary to account for individual aerodynamic effects, particularly for test glide heads, where contact with asperities on the calibration disk must produce a response signal within acceptable parameters. The difficulty with this technique is that as fly heights decrease, correlation of static gram loads with actual fly heights becomes more difficult and inaccurate. Furthermore, static adjustment of the upper test glide head and the lower test glide head is not precise enough to ensure both heads will fly at the same height at the same RPM (or linear velocity), requiring that the upper and lower media surfaces be tested separately, doubling test time.

U.S. Pat. No. 6,947,242 discloses an apparatus and method for dynamic fly height and roll adjustment of a physical asperity sensor (PAS) head. The PAS head is used to test disk asperity heights and mechanical interference (commonly known as glide height and take off height). The PAS may be adjusted through a pivoting device such as a joystick coupled through one or more actuators to the pivoting device by actuator arms. In one embodiment, the actuator is a piezoelectric motor. The PAS head may utilize a detector to indicate the distance of the disk asperity from the PAS head. The method comprises receiving the signal and in response, operating the actuators to adjust the position of the pivoting device to obtain a selected positioning of either the fly height or the roll of the PAS.

The difficulty with the forgoing apparatus and method, is that it relies on mechanical actuators for adjustment of the fly height and glide head roll angles. These mechanical actuators must be used with a custom arm assembly that is bulky and expensive, making practical application to current testers difficult. Furthermore, mechanical systems can suffer from the need for frequent calibration due to a multitude of moving parts with tolerances that can change over time.

What is needed is a better method and apparatus for calibrating test glide heads, preferably one that enables the upper and lower surfaces of magnetic media to be tested at the same RPM or linear velocity.

SUMMARY OF THE INVENTION

It is an object of the present invention to provide a method for calibrating a test glide head assembly including rotating a media test disk at a first rotation rate, the media test disk having an upper surface and a lower surface, the upper surface having a first array of asperities extending above the upper surface, the lower surface having a second array of asperities extending above the lower surface; locating a test glide head assembly over the media test disk, the test glide head assembly having an upper test glide head positioned over the first array of asperities, the test glide head assembly having a lower test glide head positioned over the second array of asperities; adjusting a gram loading of an upper test glide head gimbal assembly to provide contact of the upper test glide head with the first array of asperities, while the media test disk is rotating at the first rotation rate, by applying laser radiation to a first portion of the upper test glide head gimbal assembly; and, adjusting a gram loading of a lower test glide head gimbal assembly to provide contact of the lower test glide head with the second array of asperities, while the media test disk is rotating at the first rotation rate, by applying laser radiation to a first portion of the lower test glide head gimbal assembly.

It is another object of the present invention to provide a method for calibrating a test glide head assembly including rotating a media test disk at a first rotation rate, the media test disk having an upper surface, the upper surface having an array of asperities extending above the upper surface; locating a test glide head assembly over the media test disk, the test glide head assembly having an upper test glide head positioned over the array of asperities; adjusting a gram loading of an upper test glide head gimbal assembly to provide contact of the upper test glide head with the array of asperities, while the media test disk is rotating at the first rotation rate, by applying laser radiation to a first portion of the upper test glide head gimbal assembly; inverting the media test disk so that the array of asperities is located on a lower surface of the media test disk, and locating the test glide head assembly over the media test disk such that a lower test glide head is positioned over the array of asperities; and, adjusting a gram loading of a lower test glide head gimbal assembly to provide contact of the lower test glide head with the array of asperities, while the media test disk is rotating at the first rotation rate, by applying laser radiation to a first portion of the lower test glide head gimbal assembly.

It is yet another object of the present invention to provide a method for testing production magnetic media including installing a test glide head assembly on a production media tester, the test glide head assembly comprising an upper test glide head gimbal assembly and a lower test glide head gimbal assembly; installing a media test disk on the production media tester, the media test disk having an upper surface and a lower surface, the upper surface having a first array of asperities extending above the upper surface, the lower surface having a second array of asperities extending above the lower surface; rotating the media test disk at a first rotation rate; locating the test glide head assembly over the media test disk, the test glide head assembly having an upper test glide head positioned over the first array of asperities, the test glide head assembly having a lower test glide head positioned over the second array of asperities; adjusting a gram loading of the upper test glide head gimbal assembly to provide contact of the upper test glide head with the first array of asperities, while the media test disk is rotating at the first rotation rate, by applying laser radiation to a first portion of the upper test glide head gimbal assembly; adjusting a gram loading of the lower test glide head gimbal assembly to provide contact of the lower test glide head with the second array of asperities, while the media test disk is rotating at the first rotation rate, by applying laser radiation to a first portion of the lower test glide head gimbal assembly; installing a least one production media disk on the production media tester, the media disk having an upper surface and a lower surface; and, simultaneously scanning the upper and lower surfaces of the production media disk at a second rotation rate with the test glide head assembly.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
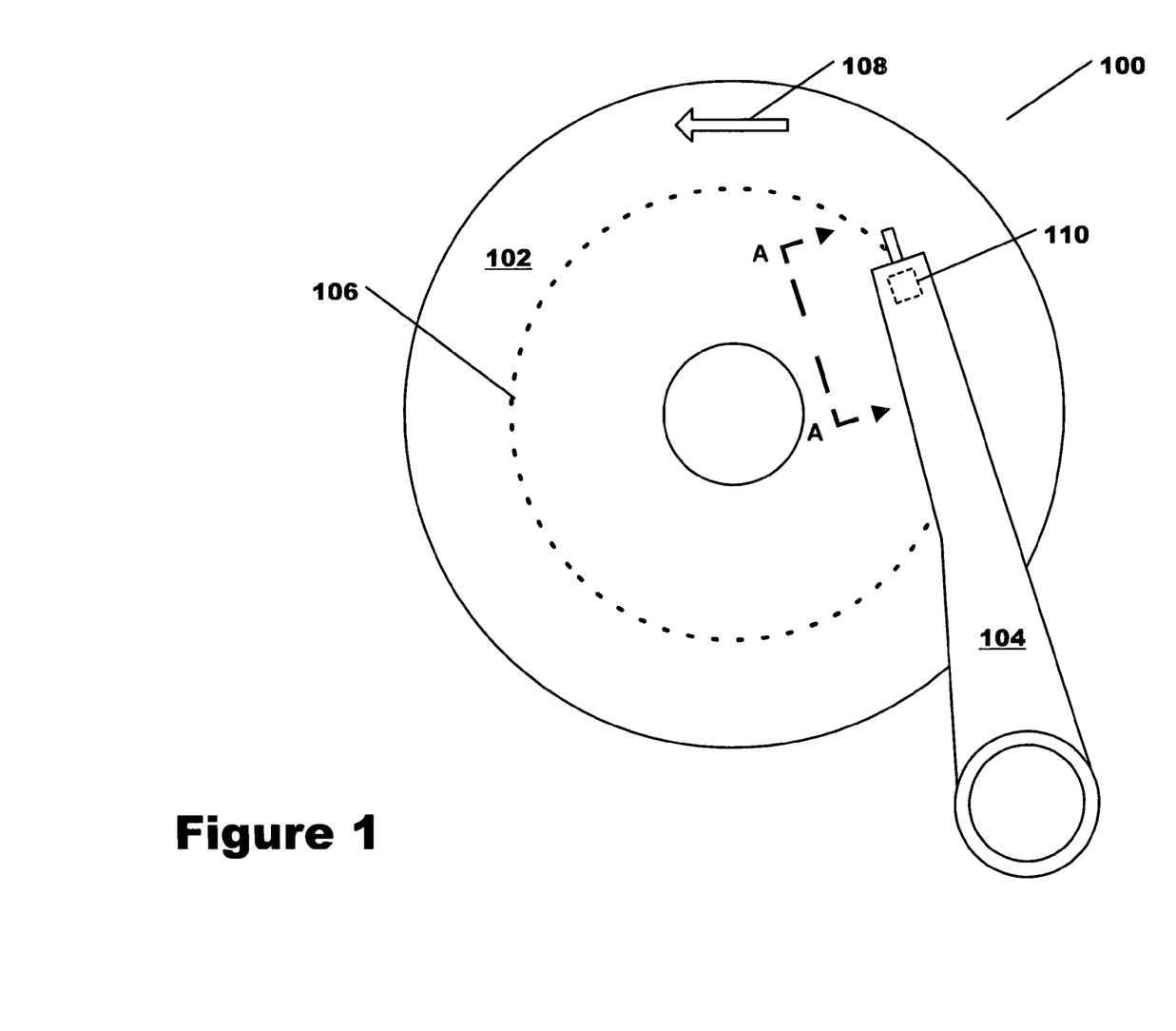
FIG. 1 is a plan view of a simplified test glide head calibration apparatus in accordance with an embodiment of the present invention.

FIG. 1 is a plan view 100 of a simplified test glide head calibration apparatus in accordance with an embodiment of the present invention. Arm 104 supports test glide head 110 over test media disk 102, which contains an array of asperities 106. Asperities 106 are microscopic structures, extending above the disk surface at carefully controlled dimensions. Although a single array of asperities 106 is shown in FIG. 1, test disk 102 may have one or more arrays, usually at different radial positions, in accordance with techniques known to those skilled in the art. Test glide head 110 is designed to detect contact with the asperities 106, producing an electrical signal upon contact. Disk 102 is rotated in the direction of arrow 108. At high rotation speeds (RPM), arm 104 and test glide head 110 will fly above the surface of disk 102 at a level above the asperities 106, so no contact will be registered and the signal output from head 110 will be negligible. As the RPM is lowered, the fly height will drop, contact of the test glide head 110 with the asperities will occur, and a signal output from head 110 will be detected. At this particular RPM, the precise fly height of the test glide head is determined by the distance that the asperities extend above the disk surface. This process may be repeated with different arrays of asperities having different dimensions (not shown), producing data that defines the fly height versus disk RPM over a range of disk velocities. In this manner, calibration of the test glide head can be performed.

The primary function of test glide head 110 is to detect unwanted asperities on production magnetic media. Once the test is head is calibrated, the information can be used for testing production magnetic media that is subsequently installed in disk drives. In one embodiment of the present invention, arm 104 and test glide head 110 is calibrated on a dedicated test and calibration machine, then relocated to a production media test machine. This may be done to maximize up-time on the production media tester, where there are significant costs incurred when the media tester is off-line. In an other embodiment of the present invention, calibration of the test glide head and subsequent testing of the production media is accomplished on the production media tester. The advantage of this embodiment is that the test glide head and arm assembly do not have to be moved following calibration, which may improve the accuracy of the media testing.

During production media testing, the test glide head is scanned over the production media surface at predetermined RPM levels (or linear velocities). Any unwanted surface defects that extend above the surface at a level greater than the fly height of the test glide head, will impact the head producing an output signal. The production media can then be accepted or rejected based on the results of the scan. It is evident from the foregoing that the fly height of the test glide heads must be lower than that of the read/write heads in the actual disk drive, in order to detect unwanted surface defects at levels well below where they would contact the read/write heads. As fly heights of the read/write heads decrease due to increased areal densities, so must the fly heights of the test glide heads, placing an enhanced importance on the calibration process.

Typically, production media are tested for surface defects a single disk at a time. These disks may then be stacked into arrays in the final disk drive. Each media disk has an upper and lower surface, and each of these surfaces must be checked in the production media tester. Not specifically shown in FIG. 1 is a mating arm containing a second test glide head for testing the underside of the media disk. Current practice requires that each side of the production media disk be scanned at different RPMs, due to physical and aerodynamic differences in the mating arms. This requirement results in a test time which is about double the test time of a single surface. It is an advantage of the present invention to provide method and apparatus wherein the calibration of the upper and lower test glide heads are normalized to the same RPM, allowing both surfaces to be tested simultaneously, cutting test time by about a factor of two.

Figure 2:
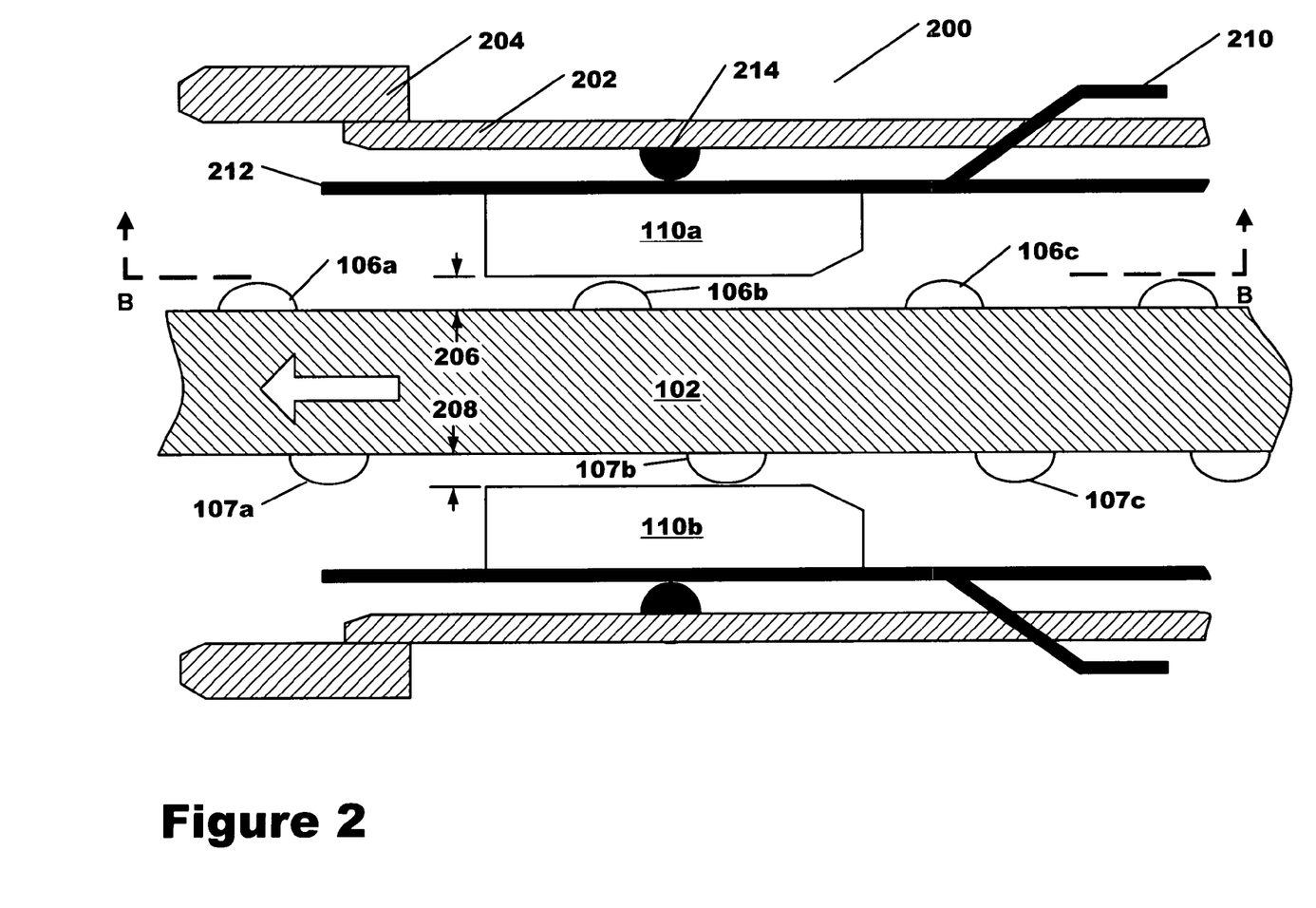
FIG. 2 is a partial cross section view through A-A of FIG. 1 in accordance with an embodiment of the present invention.

FIG. 2 is a partial cross section view 200 through A-A of FIG. 1 in accordance with an embodiment of the present invention. This view discloses test media disk 102 having asperities 106a-c on the upper surface, and 107a-c on the lower surface. Alternatively, a disk having asperities on only one surface can be used, wherein the disk is mounted asperity side up or asperity side down, depending on which glide head is being calibrated. However, a test media disk having asperities on both sides is preferred, to reduce calibration time. Upper test glide head 110a is shown flying above asperities 106a-c at a fly height of dimension 206. Lower test glide head 110b is shown flying above asperities 107a-c at a fly height of dimension 208. Prior to calibration, dimensions 206 and 208 will be different, at the same disk rotation rate (RPM). Test glide head 110a is mounted to flexure 212. Flexure 212 contacts load beam 202 at pivot 214 and at fixed mounting points (not shown). Limiter tab 210 extends through an aperture in load beam 202 to minimize deflection of flexure 212 when the entire assembly is lifted from the disk surface. Load/unload tab 204 is utilized for this purpose. The assembly comprising test glide head 110a, flexure 212, pivot 214, load beam 202, and load/unload tab 204 is often referred to as a head gimbal assembly, or HGA. For purposes of this disclosure, these components are referred to as a test glide head gimbal assembly, test glide HGA, or TGHGA.

An important goal of the present invention is to obtain a close match between the upper fly height 206 and lower fly height 208 while the disk is rotating at the same RPM. One factor in achieving this goal is the ability, provided by an aspect of the present invention, to adjust the gram loading of the upper test glide HGA and the lower test glide HGA dynamically, that is, while the test glide head is flying over a test media disk.

Past practice has relied upon measurements made in a static environment, either on an unloaded TGHGA, or a TGHGA resting on a non moving pressure or load sensing device. In the unloaded case, a flexure angle is measured and then adjusted, mechanically or by applying heat. The gram loading is then estimated by correlation or experience. Final calibration is done by adjusting the RPM of the test media disk until contact with the asperities is detected. However, this process is not precise enough to ensure a close match between upper and lower test glide head fly heights at the same RPM, so any subsequent scanning of media disks after calibration must be done at two separate RPM levels; one for the upper surface and one for the lower surface.

In the present invention, gram loading, or more specifically fly height, is adjusted with the test glide head flying over the media test disk. This is accomplished by applying pulsed laser radiation to a specific location of the flexure. The heating caused by the laser radiation alters the material properties of the flexure, changing it's effective spring constant, and subsequently the fly height. The application of the pulsed laser radiation may be applied to upper and lower TGHGAs sequentially or simultaneously, while the test glide heads are flying over asperities on the test media disk 102 at the same RPM. One advantage of the present invention is that application of the pulsed laser radiation is effectively a "non-contact" method, and is less likely to upset the delicate hydrodynamic balance of a dynamic system when compared to, for example, to a mechanical system where motors and actuators are utilized to adjust the fly height.

Figure 3:
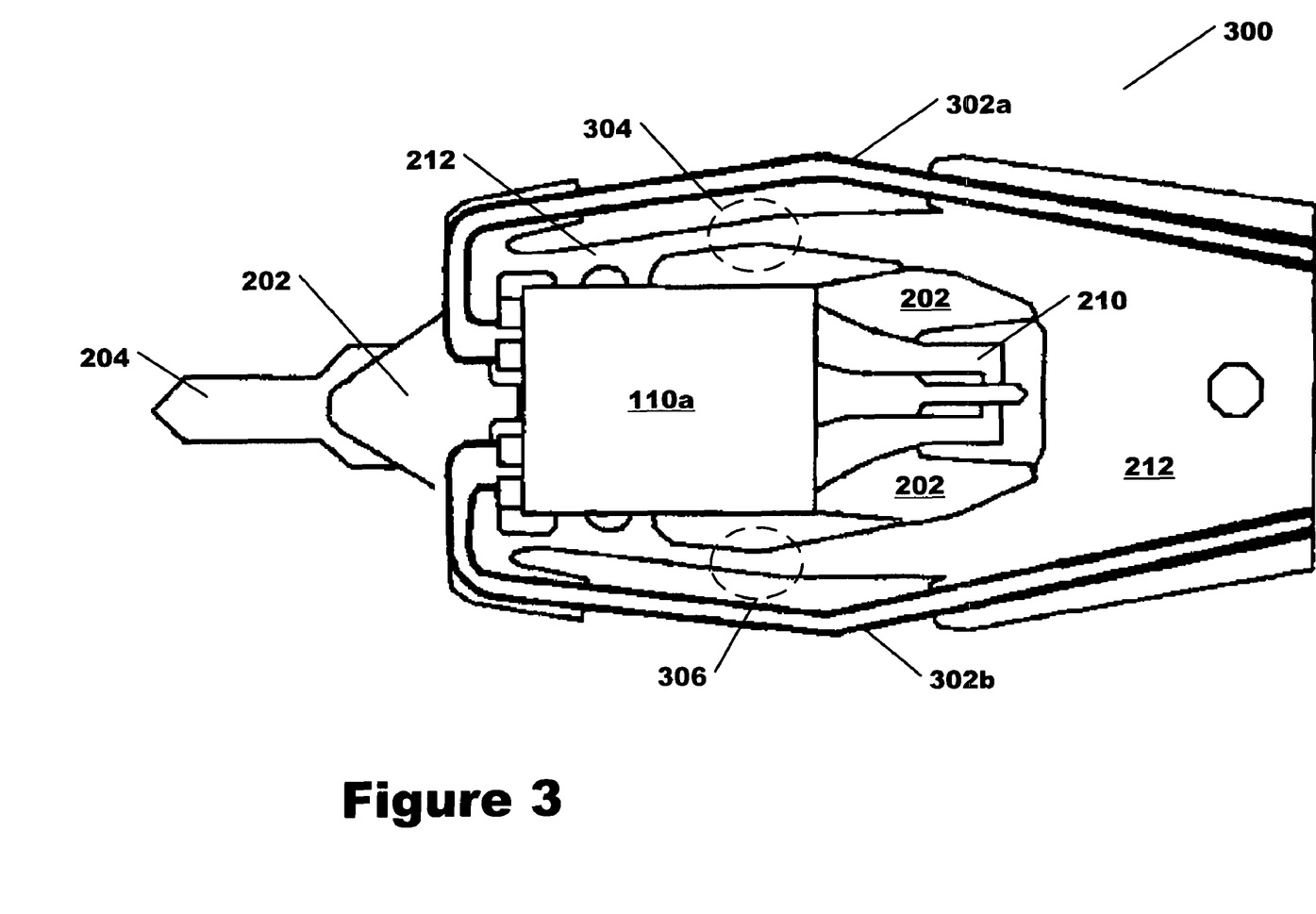
FIG. 3 is a partial plan view through section B-B of FIG. 2 in accordance with an embodiment of the present invention.

FIG. 3 is a partial plan view 300 through section B-B of FIG. 2 in accordance with an embodiment of the present invention. This figure provides an underside view of the upper test glide HGA of FIG. 2. Electrical leads 302a,b enable signal communication with test glide head 110a. Laser radiation is applied to zones 304 and 306 of flexure 212 to dynamically adjust the fly height of glide head 110a. The laser radiation may be applied directly by focusing a laser beam on zones 304 and 306 (not shown), or preferably, the laser radiation may be directed to zones 304 and 306 via flexible fiber optic cable (not shown). The use of fiber optic cable is desirable because it can be mounted to the TGHGA and held in the required position. The need for complex vision and laser tracking systems, which are required for applying a beam directly to the flexure while the test glide head is flying over a disk surface, are eliminated. If optical cable is used, two segments are utilized (not shown), one for directing light at zone 304, one for directing light at zone 306. Preferably, these optical cables are connected to an optical source (not shown) that permits the application of laser light to each zone 304, 306 independently. The optical source can be two independent laser sources, or an optical switch coupled to a single laser. Alternatively, each fiber optic segment can be coupled to a beam splitter and a single laser source. The techniques required for coupling laser sources, optical switches, beam splitters, and fiber optic cable are well known to those skilled in the art. In like manner, two addition fiber optic cable segments are applied to the corresponding lower TGHGA flexure zones (not shown). These segments may also be connected to two additional laser sources, or an additional laser source through a splitter or optical switch. Preferably, all four fiber optic cable segments (two for the upper TGHGA, two for the lower TGHGA) are coupled to a single laser source through an optical switch that allows independent application of laser light to each of the four flexure zones. By independent application, it is meant the optical switch can provide laser light to all four zones simultaneously, any single zone individually, or any combination thereof.

Figure 4:
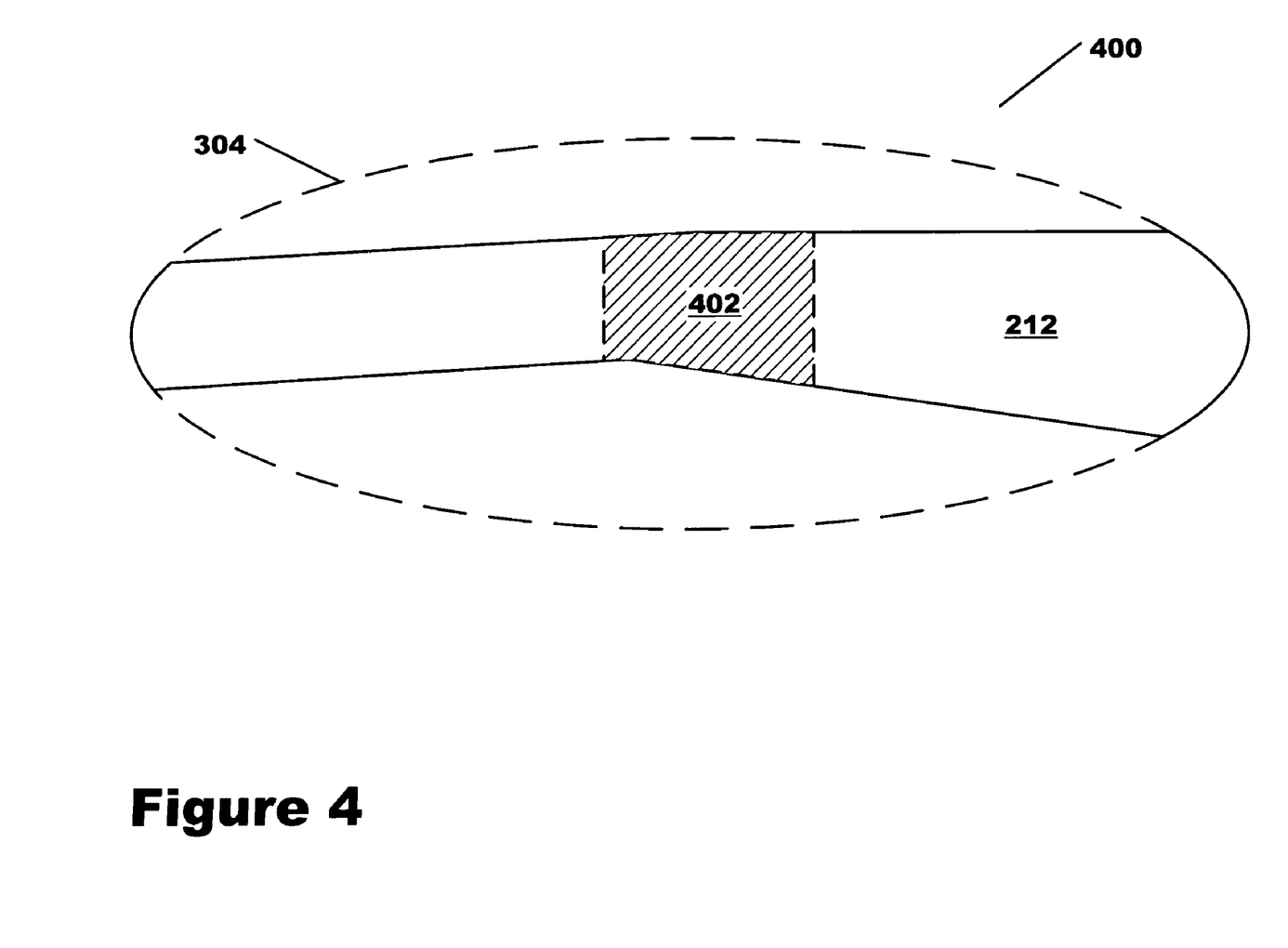
FIG. 4 is a detail view of flexure zone 304 in accordance with an embodiment of the present invention.

FIG. 4 is a detail view 400 of flexure zone 304 in accordance with an embodiment of the present invention. Pulsed laser radiation is applied to area 402 to alter the properties of flexure 212, which in turn is utilized to alter the fly height of the test glide head. In an embodiment of the present invention, pulsed laser radiation having a wavelength of about 1 micron, produced from Nd:YAG or Nd:YLF lasers are used. Alternatively, other laser sources may be used as is known to those skilled in the art.

Figure 5:
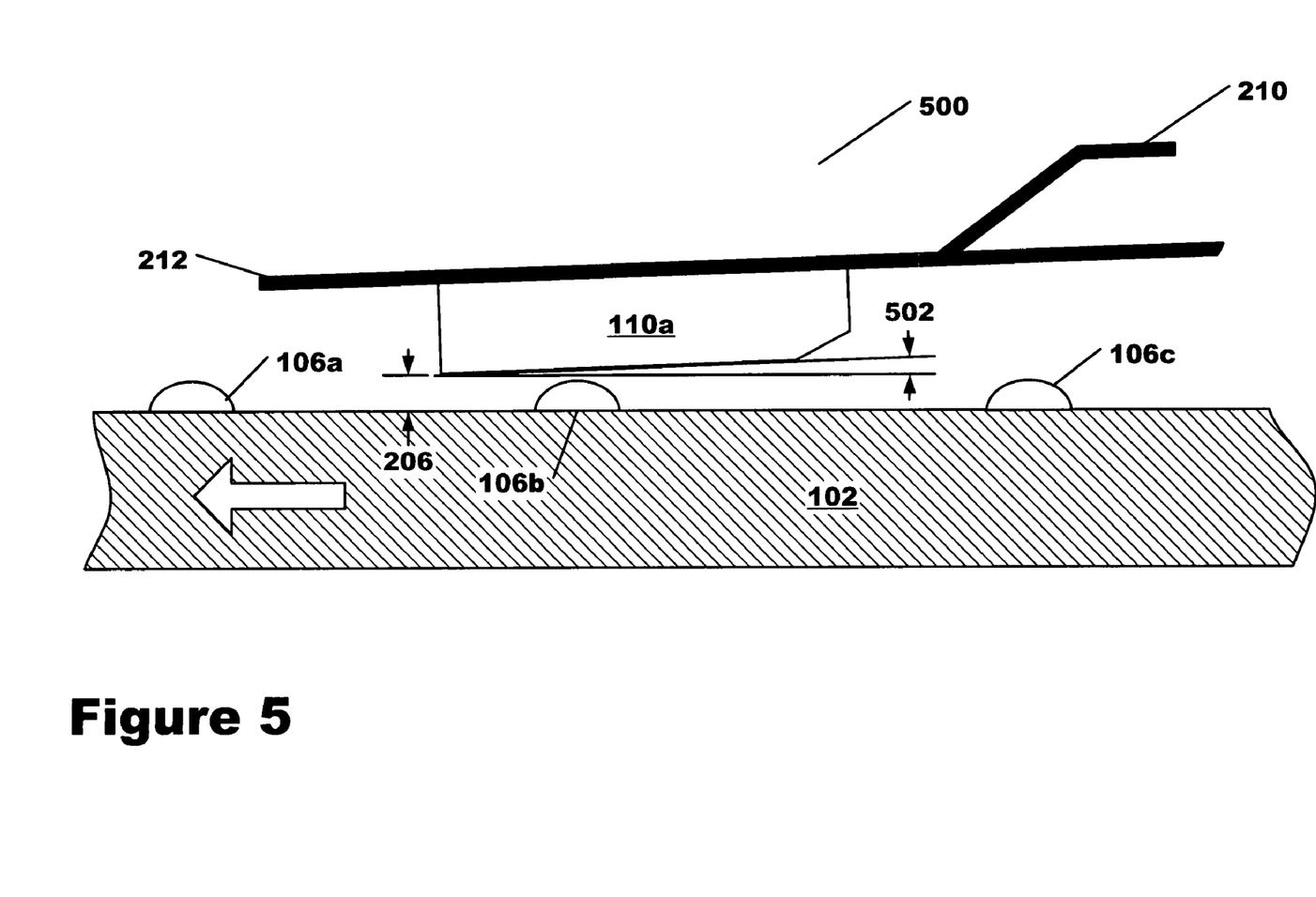
FIG. 5 is a partial cross section view of an upper test glide head gimbal assembly in accordance with an embodiment of the present invention.

FIG. 5 is a partial cross section view 500 of an upper test glide head gimbal assembly in accordance with an embodiment of the present invention. Besides the fly height 206, another important parameter that must be adjusted is pitch angle 502. It is desirable to have a positive pitch angle between 0 degrees and 0.6 degrees, to avoid damaging impact with the asperities at the leading edge of glide head 110a. A positive pitch angle is present when the fly height of the leading edge of glide head 110a is greater than fly height 206. In this case, contact with asperities 106 tend to be gradual in nature, and occur at the middle to trailing edge of the glide head. Negative pitch angles cause a more abrupt impact of the asperities with the leading edge of the glide head, which can disrupt the delicate hydrodynamic balance of the flying head, causing oscillation or even damage to the glide head. In previous practice, pitch static attitude (PSA) was measured with the HGA loaded on a non-moving surface. In the present invention, pitch angle 502 is not directly measured, but is determined by observing the signal response of asperities contacting the glide head, as the test glide HGA is lowered onto an array of asperities on media test disk. If large signal levels are detected at the onset of loading, then the pitch angle is too low, and is increased by laser adjustment of the flexure 212. If the pitch angle is too high, the signal from the test glide head will have a high degree of modulation, measured subsequent to filtering at a time constant of 25 kHz to 400 kHz. A larger than optimal pitch angle is also corrected by laser adjustment of flexure 212. Preferably, the pitch angle is adjusted prior to the final adjustment of fly height.

Figure 6A:
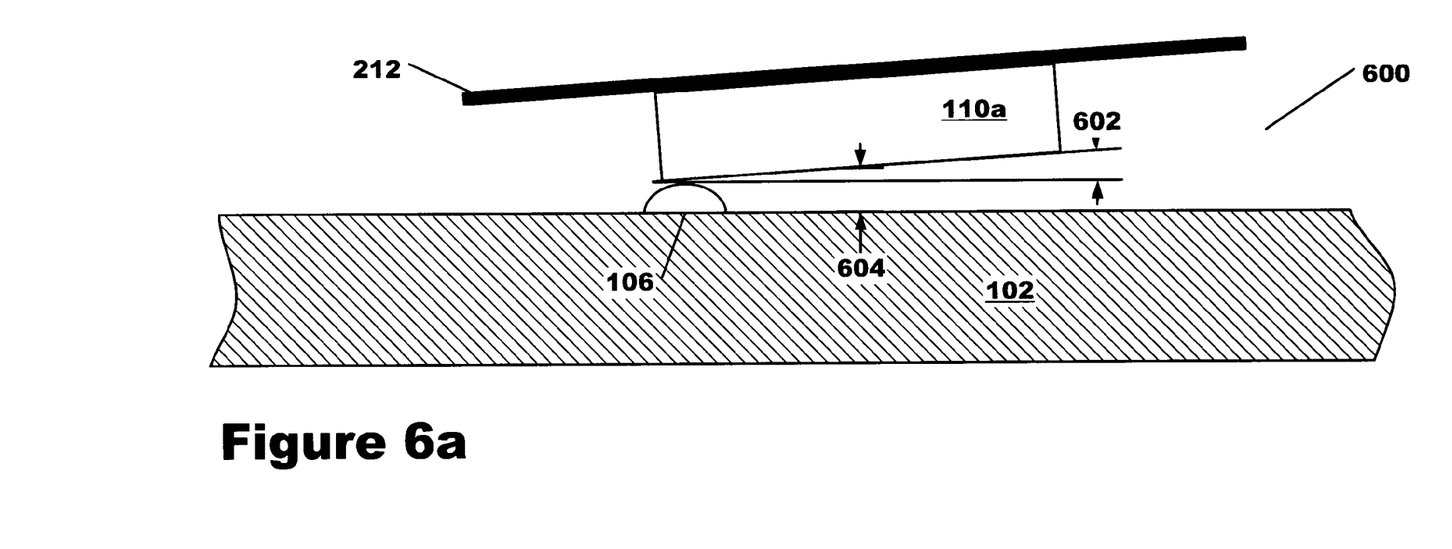
FIGS. 6a and 6b are partial cross section end views of an upper test glide head gimbal assembly in accordance with an embodiment of the present invention.
Figure 6B:
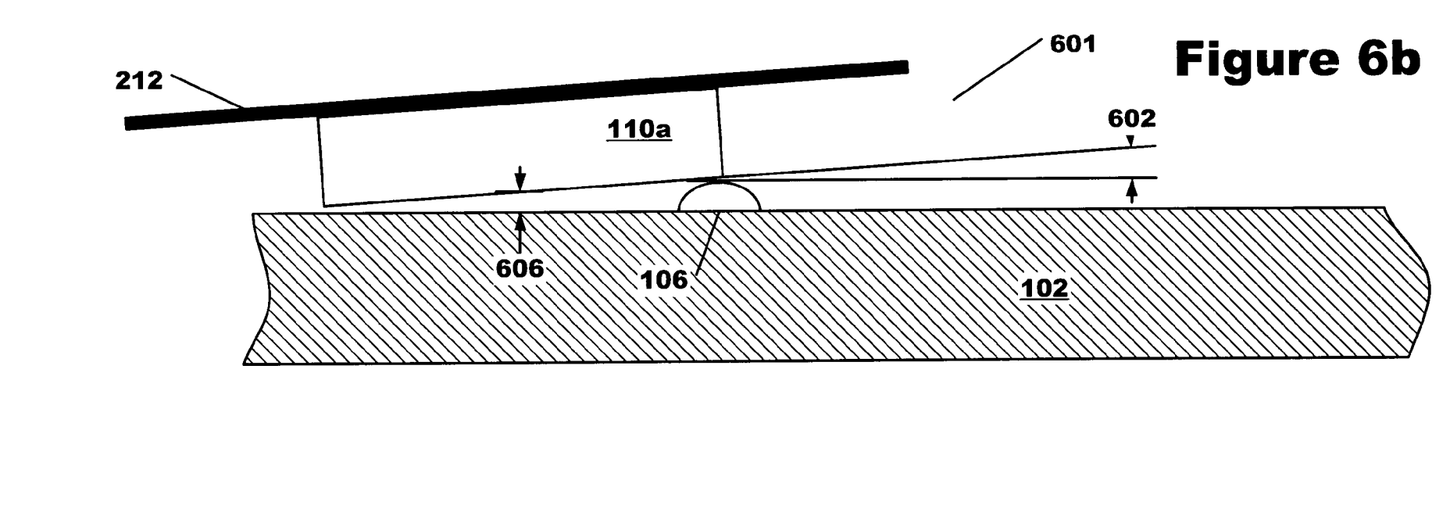

FIGS. 6a and 6b are partial cross section end views 600, 601 of an upper test glide head gimbal assembly in accordance with an embodiment of the present invention. FIGS. 6a,b illustrate a glide head 110a having a non-zero roll angle 602. Preferably, it is desirable to have roll angle as close to zero as possible. In prior practice, roll static attitude (RSA) was measured with the HGA loaded on a non-moving surface. In the present invention, roll angle 602 is determined by scanning the test glide head across a array of asperities positioned at constant radius, and adjusting the disk RPM until contact is detected. In FIG. 6a, asperity 106 is in contact with the left edge of glide head 110a, resulting in a nominal fly height 604, or a measured first RPM. In FIG. 6b, asperity 106 is in contact with the right edge of glide head 110a, resulting in nominal fly height 606, or a measured second RPM. In the case illustrated, the first RPM level is greater than the second RPM level. Roll angle 602 is minimized by laser adjustment of flexure 212 until the first and second RPM levels are with acceptable tolerances. In an alternative embodiment of the present invention, glide head signal levels are monitored as the head is scanned across the asperities at a fixed RPM level. Laser adjustment of flexure 212 is performed until signal levels are within acceptable tolerances.

Figure 7:
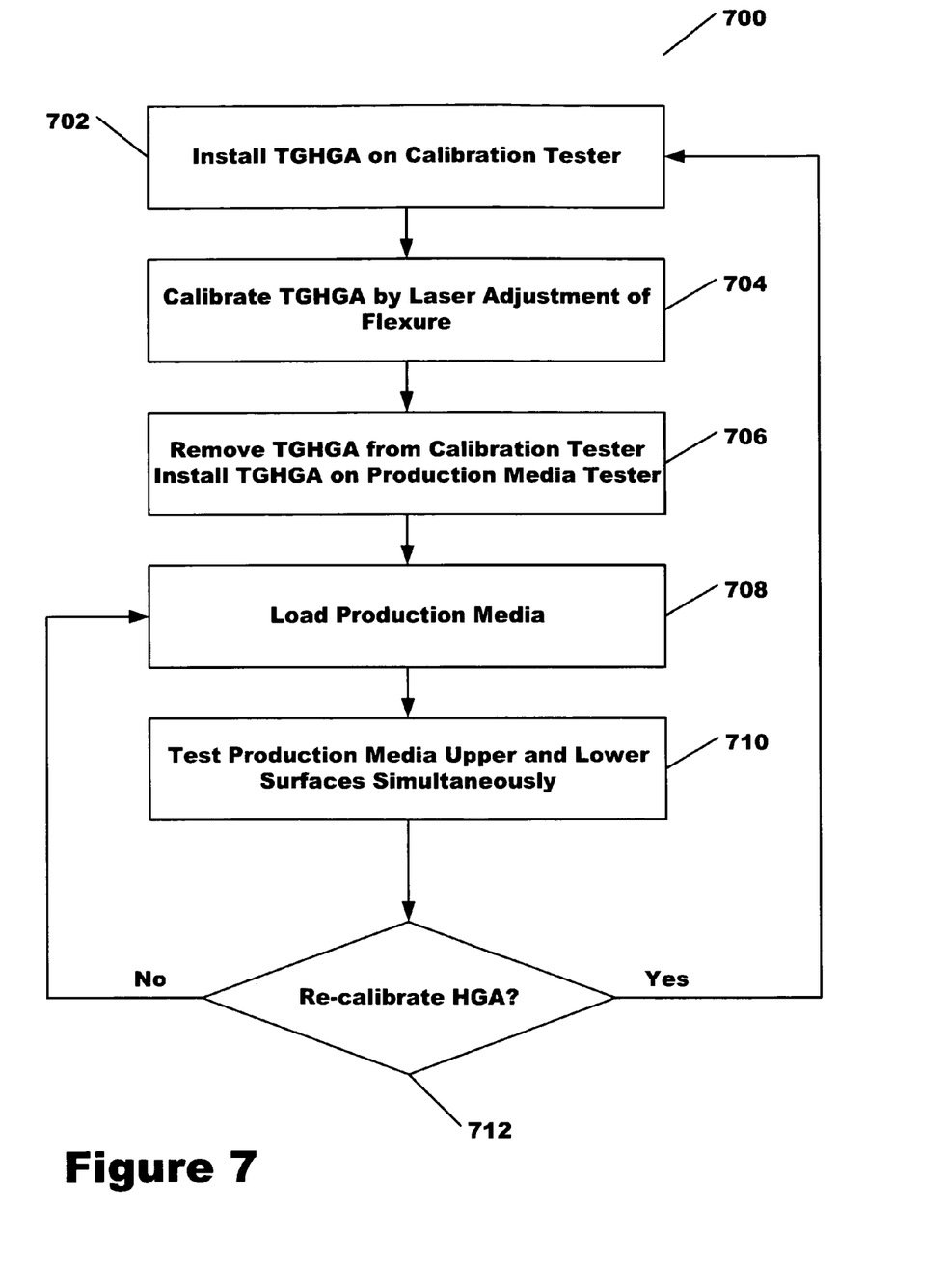
FIG. 7 is a process block diagram depicting calibration of a test glide head gimbal assembly on a calibration tester prior to testing production media in accordance with an embodiment of the present invention; and, FIG. 8 is a process block diagram depicting calibration of a test glide head gimbal assembly on the production media tester prior to testing production media in accordance with an embodiment of the present invention.

FIG. 7 is a process block diagram 700 depicting calibration of a test glide head gimbal assembly on a calibration tester prior to testing production media in accordance with an embodiment of the present invention. The process begins at step 702, wherein the test glide HGA is installed on a calibration tester. It is also assumed that a media test disk having an appropriate array of asperities is likewise installed. A calibration tester is an apparatus designed specifically for calibrating the test glide head gimbal assemblies. It allows calibration to proceed independent of production media testing. In step 704, fly height, pitch angle, and roll angle are adjusted by laser treatment of the flexure, as previously disclosed above. Both upper and lower TGHGA assemblies are calibrated for a close match in fly heights at a given RPM. Once calibrated, the TGHGA assemblies are relocated to a production media tester in step 706. In step 708, production media is loaded in the production media tester. In step 710, the production media is scanned for defects. Both upper and lower surfaces are scanned simultaneously. In step 712, the need for re-calibrating the TGHGA assemblies is determined. Re-calibration may be required after a predetermined amount of production media is tested, or at predetermined time intervals. If re-calibration is required, the process is returned to step 702. If not, the process resumes at step 708.

Figure 8:
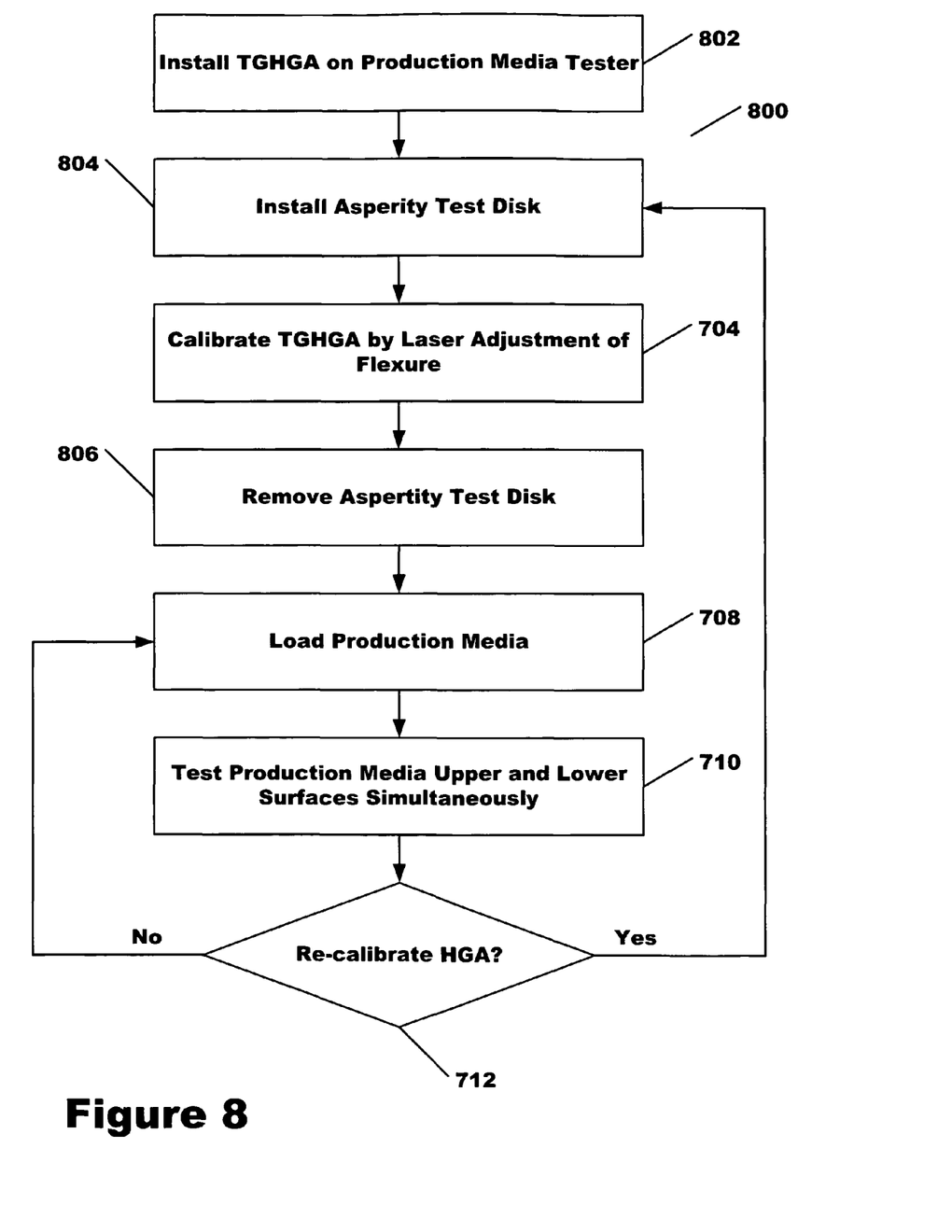

FIG. 8 is a process block diagram 800 depicting calibration of a test glide head gimbal assembly on the production media tester prior to testing production media in accordance with an embodiment of the present invention. The process begins at step 802, wherein the test glide HGA is installed on a production media tester. A production media tester is an apparatus for high volume testing of production disk media. At step 804, a media test disk containing asperities is installed on the production media tester. In step 704, fly height, pitch angle, and roll angle are adjusted by laser treatment of the flexure, as previously disclosed above. Both upper and lower TGHGA assemblies are calibrated for a close match in fly heights at a given RPM. In step 806, the media test disk is removed. The testing of production media, as disclosed in steps 708-712, is as described above in FIG. 7. If re-calibration is required, the process is returned to step 804.

The present invention is not limited by the previous embodiments heretofore described. Rather, the scope of the present invention is to be defined by these descriptions taken together with the attached claims and their equivalents.

What is claimed is:

1. A method for calibrating a test glide head assembly comprising:
    rotating a media test disk at a first rotation rate, said media test disk having an upper surface and a lower surface, said upper surface having a first array of asperities extending above said upper surface, said lower surface having a second array of asperities extending above said lower surface;
    locating a test glide head assembly over said media test disk, said test glide head assembly having an upper test glide head positioned over said first array of asperities, said test glide head assembly having a lower test glide head positioned over said second array of asperities;
    adjusting a gram loading of an upper test glide head gimbal assembly to provide contact of said upper test glide head with said first array of asperities, while said media test disk is rotating at said first rotation rate, by applying laser radiation to a first portion of said upper test glide head gimbal assembly; and,
    adjusting a gram loading of a lower test glide head gimbal assembly to provide contact of said lower test glide head with said second array of asperities, while said media test disk is rotating at said first rotation rate, by applying laser radiation to a first portion of said lower test glide head gimbal assembly.

2. The method as recited in claim 1, further comprising:
    rotating said media test disk at a second rotation rate, subsequent to locating said test glide assembly over said media disk, to provide contact of said upper test glide head with said first array of asperities;

adjusting said gram loading of said lower test glide head gimbal assembly to provide contact of said lower test glide head with said second array of asperities, while said media test disk is rotating at said second rotation rate, by applying laser radiation to said first portion of said lower test glide head gimbal assembly.

3. The method as recited in claim 1, further comprising:
rotating said media test disk at a second rotation rate, subsequent to locating said test glide assembly over said media disk, to provide contact of said lower test glide head with said second array of asperities;
adjusting said gram loading of said upper test glide head gimbal assembly to provide contact of said upper test glide head with said first array of asperities, while said media test disk is rotating at said second rotation rate, by applying laser radiation to said first portion of said upper test glide head gimbal assembly.

4. The method as recited in claim 1, further comprising:
producing a first signal from said upper test glide head in response to contact of said upper test glide head with said first array of asperities;
adjusting a pitch angle of said upper test glide head, while said media test disk is rotating at said first rotation rate, by applying laser radiation to a second portion of said upper test glide head gimbal assembly, in response to an analysis of said first signal;
producing a second signal from said lower test glide head in response to contact of said lower test glide head with said second array of asperities; and,
adjusting a pitch angle of said lower test glide head, while said media test disk is rotating at said first rotation rate, by applying laser radiation to a second portion of said lower test glide head gimbal assembly, in response to an analysis of said second signal.

5. The method as recited in claim 4, wherein said pitch angle of said upper test glide head is increased in response to large signal levels produced during onset of contact of said upper test glide head with said first array of asperities.

6. The method as recited in claim 4, wherein said pitch angle of said lower test glide head is increased in response to large signal levels produced during onset of contact of said lower test glide head with said second array of asperities.

7. The method as recited in claim 4, wherein said pitch angle of said upper test glide head is decreased in response to a high degree of modulation of said first signal, produced during contact of said upper test glide head with said first array of asperities.

8. The method as recited in claim 4, wherein said pitch angle of said lower test glide head is decreased in response to a high degree of modulation of said second signal, produced during contact of said lower test glide head with said second array of asperities.

9. The method as recited in claim 1, further comprising:
scanning said upper test glide head over said first array of asperities to determine a first roll angle of said upper test glide head;
scanning said lower test glide head over said second array of asperities to determine a second roll angle of said lower test glide head;
minimizing said first roll angle, while said media test disk is rotating at said first rotation rate, by applying laser radiation to a third portion of said upper test glide head gimbal assembly; and,
minimizing said second roll angle, while said media test disk is rotating at said first rotation rate, by applying laser radiation to a third portion of said lower test glide head gimbal assembly.

10. A method for calibrating a test glide head assembly comprising:
rotating a media test disk at a first rotation rate, said media test disk having an upper surface, said upper surface having an array of asperities extending above said upper surface;
locating a test glide head assembly over said media test disk, said test glide head assembly having an upper test glide head positioned over said array of asperities;
adjusting a gram loading of an upper test glide head gimbal assembly to provide contact of said upper test glide head with said array of asperities, while said media test disk is rotating at said first rotation rate, by applying laser radiation to a first portion of said upper test glide head gimbal assembly;
inverting said media test disk so that said array of asperities is located on a lower surface of said media test disk, and locating said test glide head assembly over said media test disk such that a lower test glide head is positioned over said array of asperities; and,
adjusting a gram loading of a lower test glide head gimbal assembly to provide contact of said lower test glide head with said array of asperities, while said media test disk is rotating at said first rotation rate, by applying laser radiation to a first portion of said lower test glide head gimbal assembly.

11. A method for testing production magnetic media comprising:
installing a test glide head assembly on a production media tester, said test glide head assembly comprising an upper test glide head gimbal assembly and a lower test glide head gimbal assembly;
installing a media test disk on said production media tester, said media test disk having an upper surface and a lower surface, said upper surface having a first array of asperities extending above said upper surface, said lower surface having a second array of asperities extending above said lower surface;
rotating said media test disk at a first rotation rate;
locating said test glide head assembly over said media test disk, said test glide head assembly having an upper test glide head positioned over said first array of asperities, said test glide head assembly having a lower test glide head positioned over said second array of asperities;
adjusting a gram loading of said upper test glide head gimbal assembly to provide contact of said upper test glide head with said first array of asperities, while said media test disk is rotating at said first rotation rate, by applying laser radiation to a first portion of said upper test glide head gimbal assembly;
adjusting a gram loading of said lower test glide head gimbal assembly to provide contact of said lower test glide head with said second array of asperities, while said media test disk is rotating at said first rotation rate, by applying laser radiation to a first portion of said lower test glide head gimbal assembly;
installing a least one production media disk on said production media tester, said at least one production media disk having an upper surface and a lower surface; and,
simultaneously scanning said upper and said lower surfaces of said production media disk at a second rotation rate with said test glide head assembly.

12. The method as recited in claim 11, further comprising:
rotating said media test disk at a third rotation rate, subsequent to locating said test glide assembly over said media disk, to provide contact of said upper test glide head with said first array of asperities;

adjusting said gram loading of said lower test glide head gimbal assembly to provide contact of said lower test glide head with said second array of asperities, while said media test disk is rotating at said third rotation rate, by applying laser radiation to said first portion of said lower test glide head gimbal assembly.

13. The method as recited in claim 11, further comprising:
rotating said media test disk at a third rotation rate, subsequent to locating said test glide assembly over said media disk, to provide contact of said lower test glide head with said second array of asperities;
adjusting said gram loading of said upper test glide head gimbal assembly to provide contact of said upper test glide head with said first array of asperities, while said media test disk is rotating at said third rotation rate, by applying laser radiation to said first portion of said upper test glide head gimbal assembly.

14. The method as recited in claim 11, further comprising:
producing a first signal from said upper test glide head in response to contact of said upper test glide head with said first array of asperities;
adjusting a pitch angle of said upper test glide head, while said media test disk is rotating at said first rotation rate, by applying laser radiation to a second portion of said upper test glide head gimbal assembly, in response to an analysis of said first signal;
producing a second signal from said lower test glide head in response to contact of said lower test glide head with said second array of asperities; and,
adjusting a pitch angle of said lower test glide head, while said media test disk is rotating at said first rotation rate, by applying laser radiation to a second portion of said lower test glide head gimbal assembly, in response to an analysis of said second signal.

15. The method as recited in claim 14, wherein said pitch angle of said upper test glide head is increased in response to large signal levels produced during onset of contact of said upper test glide head with said first array of asperities.

16. The method as recited in claim 14, wherein said pitch angle of said lower test glide head is increased in response to large signal levels produced during onset of contact of said lower test glide head with said second array of asperities.

17. The method as recited in claim 14, wherein said pitch angle of said upper test glide head is decreased in response to a high degree of modulation of said first signal, produced during contact of said upper test glide head with said first array of asperities.

18. The method as recited in claim 14, wherein said pitch angle of said lower test glide head is decreased in response to a high degree of modulation of said second signal, produced during contact of said lower test glide head with said second array of asperities.

19. The method as recited in claim 11, further comprising:
scanning said upper test glide head over said first array of asperities to determine a first roll angle of said upper test glide head;
scanning said lower test glide head over said second array of asperities to determine a second roll angle of said lower test glide head;
minimizing said first roll angle, while said media test disk is rotating at said first rotation rate, by applying laser radiation to a third portion of said upper test glide head gimbal assembly; and,
minimizing said second roll angle, while said media test disk is rotating at said first rotation rate, by applying laser radiation to a third portion of said lower test glide head gimbal assembly.

20. The method as recited in claim 11, wherein laser radiation is directed to said upper and said lower test glide head gimbal assemblies by fiber optic cable.

* * * * *